United States Patent
Adams, Jr. et al.

(10) Patent No.: US 9,726,284 B2
(45) Date of Patent: Aug. 8, 2017

(54) NEUTRAL-HOLD MODE SYSTEM AND METHOD

(71) Applicant: HONDA MOTOR CO., LTD., Tokyo (JP)

(72) Inventors: Virgil Philip Adams, Jr., Raymond, OH (US); Ryo Harada, Raymond, OH (US); Takashi Tezuka, Raymond, OH (US); David B. Jackson, Raymond, OH (US); Hiroyuki Kuki, Raymond, OH (US); Dennis P. Parker, Jr., Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 14/701,140

(22) Filed: Apr. 30, 2015

(65) Prior Publication Data

US 2016/0319933 A1 Nov. 3, 2016

(51) Int. Cl.

| F16H 63/48 | (2006.01) |
| F16H 10/06 | (2006.01) |
| B60W 10/10 | (2012.01) |
| F16H 63/34 | (2006.01) |
| F16H 59/50 | (2006.01) |
| F16H 59/74 | (2006.01) |
| F16H 61/20 | (2006.01) |
| F16H 61/16 | (2006.01) |

(52) U.S. Cl.
CPC ......... *F16H 63/48* (2013.01); *F16H 63/3491* (2013.01); *B60W 10/06* (2013.01); *B60W 10/10* (2013.01); *B60W 2510/24* (2013.01); *B60W 2510/244* (2013.01); *B60W 2560/00* (2013.01); *B60W 2710/1005* (2013.01); *F16H 59/50* (2013.01); *F16H 2059/746* (2013.01); *F16H 2061/168* (2013.01); *F16H 2061/207* (2013.01)

(58) Field of Classification Search
CPC .. B60W 10/06; B60W 10/10; B60W 2560/00; B60W 2510/24; B60W 2510/244; B60W 2710/1005; F16H 61/18
See application file for complete search history.

(56) References Cited

U.S. PATENT DOCUMENTS

| 4,790,204 A * | 12/1988 | Tury ....................... F16H 59/12 |
| | | 73/866.1 |
| 4,843,901 A * | 7/1989 | Peterson ................. F16H 59/12 |
| | | 74/335 |
| 4,892,014 A | 1/1990 | Morell et al. |
| 4,967,883 A | 11/1990 | Kito et al. |
| 5,042,133 A | 8/1991 | Peterson et al. |
| 6,918,314 B2 | 7/2005 | Wang |
| 8,016,719 B2 | 9/2011 | Hecht et al. |

(Continued)

*Primary Examiner* — Ramya Burgess
*Assistant Examiner* — David Morris
(74) *Attorney, Agent, or Firm* — Arent Fox LLP (57) ABSTRACT

A system for maintaining a vehicle including a shift-by-wire transmission in a neutral-hold mode is provided. The system includes a transmission control unit in signal communication with the shift-by-wire transmission and an internal control unit of the vehicle. The transmission control unit is configured to control a gear configuration of the shift-by-wire transmission. An external control unit is in signal communication with the transmission control unit. The external control unit is configured to transmit a neutral-hold mold activation signal.

19 Claims, 4 Drawing Sheets

(56) References Cited

U.S. PATENT DOCUMENTS

| | | |
|---|---|---|
| 8,062,176 B2 | 11/2011 | Hecht et al. |
| 8,235,866 B2 | 8/2012 | Steinhauser et al. |
| 8,301,348 B2 | 10/2012 | Nagashima et al. |
| 8,515,635 B2 * | 8/2013 | Spaulding ........... F16H 59/0217 180/370 |
| 8,521,378 B2 * | 8/2013 | Steinhauser .......... F16H 63/483 180/337 |
| 8,648,689 B2 * | 2/2014 | Hathaway ............... B60K 28/12 292/216 |
| 8,897,978 B2 * | 11/2014 | Fyie ....................... F16H 59/08 701/62 |
| 2004/0178050 A1 | 9/2004 | Wylde |
| 2009/0287383 A1 | 11/2009 | Fujii et al. |
| 2012/0232765 A1 | 9/2012 | Holub et al. |
| 2013/0151095 A1 | 6/2013 | Fyie et al. |

* cited by examiner

NEUTRAL-HOLD MODE SYSTEM AND METHOD

BACKGROUND

The subject matter disclosed herein relates to a neutral-hold mode and, more particularly, to a neutral-hold mode for vehicles including a shift-by-wire transmission.

Traditional transmission systems include a mechanical linkage between a gear selector and a transmission. The gear selector may be positioned on a steering wheel shaft, a central portion of a dashboard, or centrally on a console. Mechanical linkages have been used in conventional systems because of design simplicity and reliability. However, shift-by-wire transmission systems have been developed that have advantages over the transmission systems including mechanical linkages.

With advances in digital microelectronics, the control systems available to vehicle manufacturers allow for many configurations and vehicle capabilities that were not possible with traditional mechanical or simple electrical control systems. The new control systems provide a great deal of flexibility and opportunity to produce cars with improved capabilities in terms of performance, safety, and efficiency. However, because modern vehicle control systems are sophisticated computer systems, the manufacturing process requires new solutions to accommodate the complexity of the vehicle control systems. Shift-by-wire transmissions are designed to change gear configurations when an electronic signal is received from a transmission control unit or a gear selection unit controlled by a user. Such shift-by-wire transmissions may include a "return to park" safety feature that does not allow the transmission to remain in neutral after predefined events, for example, after the vehicle ignition is turned off or the driver's door is opened. At different points in the assembly process, it may be beneficial to have the shift-by-wire transmission remain in neutral after the predefined events have occurred.

What is needed is a system that allows a user, such as a worker on a vehicle assembly line, to enter a vehicle in the manufacturing process into a mode that will hold the vehicle's transmission in a neutral gear configuration when other elements of a control system are programmed to shift the transmission into a parked gear configuration. A system and method for holding a vehicle having a shift-by-wire transmission in a neutral-hold mode while minimizing the drain on the battery and preventing other components of a vehicle control system from shifting the transmission into a parked gear configuration is desirable.

SUMMARY

According to one aspect, a system for maintaining a vehicle having a shift-by-wire transmission in a neutral-hold mode includes a transmission control unit in signal communication with the shift-by-wire transmission and an internal control unit of the vehicle. The transmission control unit is configured to control a gear configuration of the shift-by-wire transmission. An external control unit is in signal communication with the transmission control unit. The external control unit is configured to transmit a neutral-hold mode activation signal.

According to another aspect, a method of maintaining a vehicle in a neutral-hold mode is provided. The vehicle includes a shift-by-wire transmission, a transmission control unit, a park-lock solenoid, and an internal control unit. The method includes the transmission control unit receiving a neutral-hold mode activation signal from an external control unit. The neutral-hold mode activation signal is initiated manually or automatically by the external control unit when commumicatively coupled to the vehicle. The park-lock solenoid is activated to shift the shift-by-wire transmission to a neutral gear configuration. A false signal indicating the shift-by-wire transmission is in a parked gear configuration is transmitted from the transmission control unit to the internal control unit.

According to a further aspect, a system for maintaining a vehicle having a shift-by-wire transmission in a neutral-hold mode includes a transmission control unit in signal communication with the shift-by-wire transmission and an internal control unit of the vehicle. The transmission control unit is configured to control a gear configuration of the shift-by-wire transmission. An external control unit is in signal communication with the transmission control unit and is configured to transmit an activation signal to the transmission control unit to configure the shift-by-wire transmission in a neutral gear configuration. When an engine of the vehicle is stopped, the transmission control unit configured to transmit a signal to the internal control unit to configure the vehicle to only provide electrical power to the transmission control unit and a park-lock solenoid to maintain the neutral-hold mold.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

Figure 1:
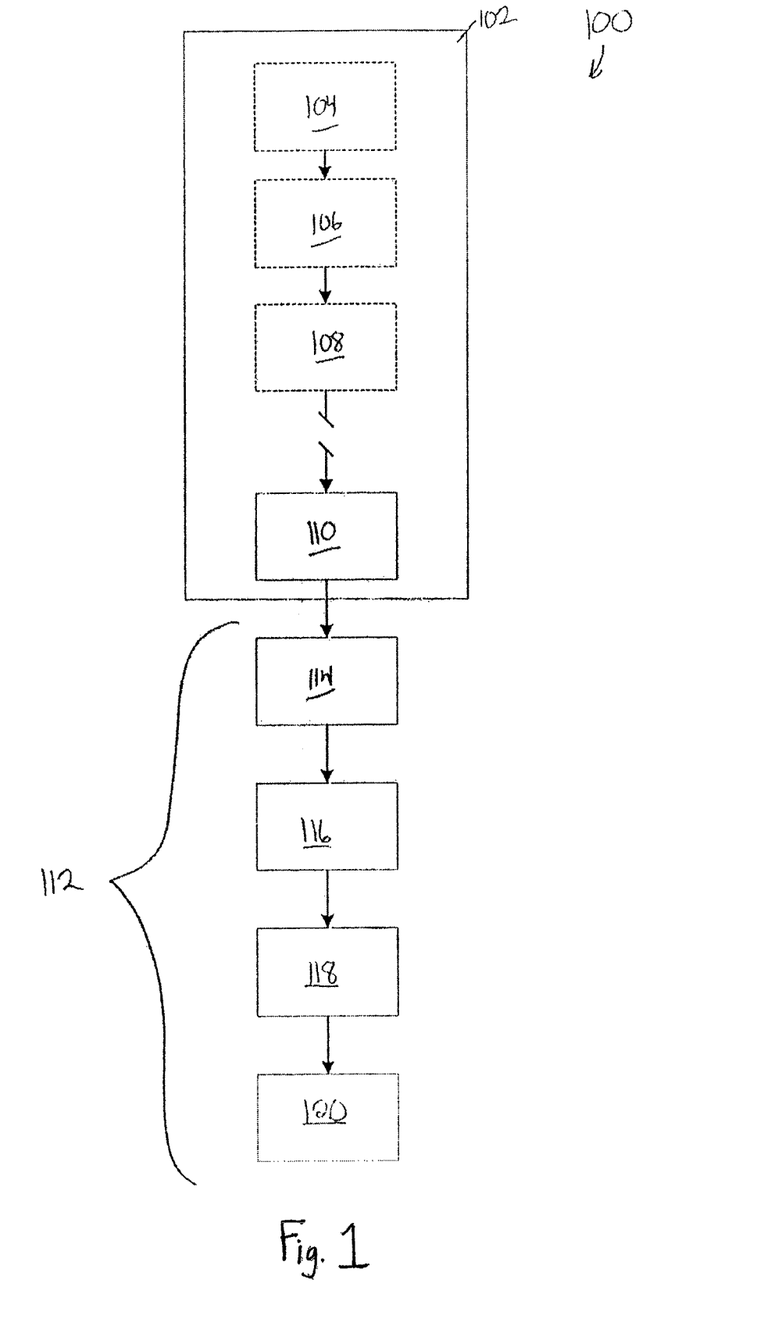
FIG. 1 is a schematic representation of a vehicle assembly process.

Referring initially to FIG. 1, a schematic representation of a vehicle assembly process 100 is depicted. The vehicle assembly process 100 is divided into two sections. The gross vehicle assembly portion 102 includes the beginning of the process through assembly of a functional vehicle (not shown) that may be driven to the next portion of the vehicle assembly process 100. The gross vehicle assembly process 102 may include forming and joining 104 the different portions of a vehicle unibody. Configuring 106 a drive train to the unibody and coupling 108 the components of a vehicle control system to the drive train may follow. It is contemplated that the portions of the gross vehicle assembly process 102 represented by dash boxes may encompass any suitable number of assembly steps and/or separate sub-processes. Some of the steps and sub-processes may be completed on separate assembly lines or in separate facilities with sub-assemblies delivered to the gross vehicle assembly process 102. One having ordinary skill in the art would understand the numerous methods and processes of assembling a vehicle to a point 110 that would allow the vehicle to be driven from the gross vehicle assembly portion 102 to a final vehicle assembly portion 112. In the final vehicle assembly portion 112, the vehicles are driven between each process and staged. In some embodiments, the wheel alignment process 114 may be followed by a wash station 116. A customer preparation line 118 may follow the wash station 116. A final preparation line 120 may represent the final assembly and inspection steps before a vehicle is ready for shipment from the factory. In some embodiments, one or more of the processes or lines 114, 116, 118, 120 within the final vehicle assembly portion 112 may require the vehicle to roll along a production line propelled by external mechanisms, such as a single slat conveyor for example. As referred to herein, a single slat conveyor is a transport system that includes a conveyor belt on only one side of the vehicle. One pair of the vehicle's wheels (i.e., either passenger side wheels or driver side wheels) are positioned on the conveyor belt while the other pair are on a stationary surface. In order for the single slat conveyor to transport the vehicle, the pair of wheels on the stationary surface must be able to freely roll, for example, by placing the vehicle transmission in neutral. One having ordinary skill in the art would understand that the final vehicle assembly portion 112 may include any number of steps or process that may keep a vehicle stationary at a particular process point or may include the vehicle rolling down a portion of a production or inspection line.

Figure 2:
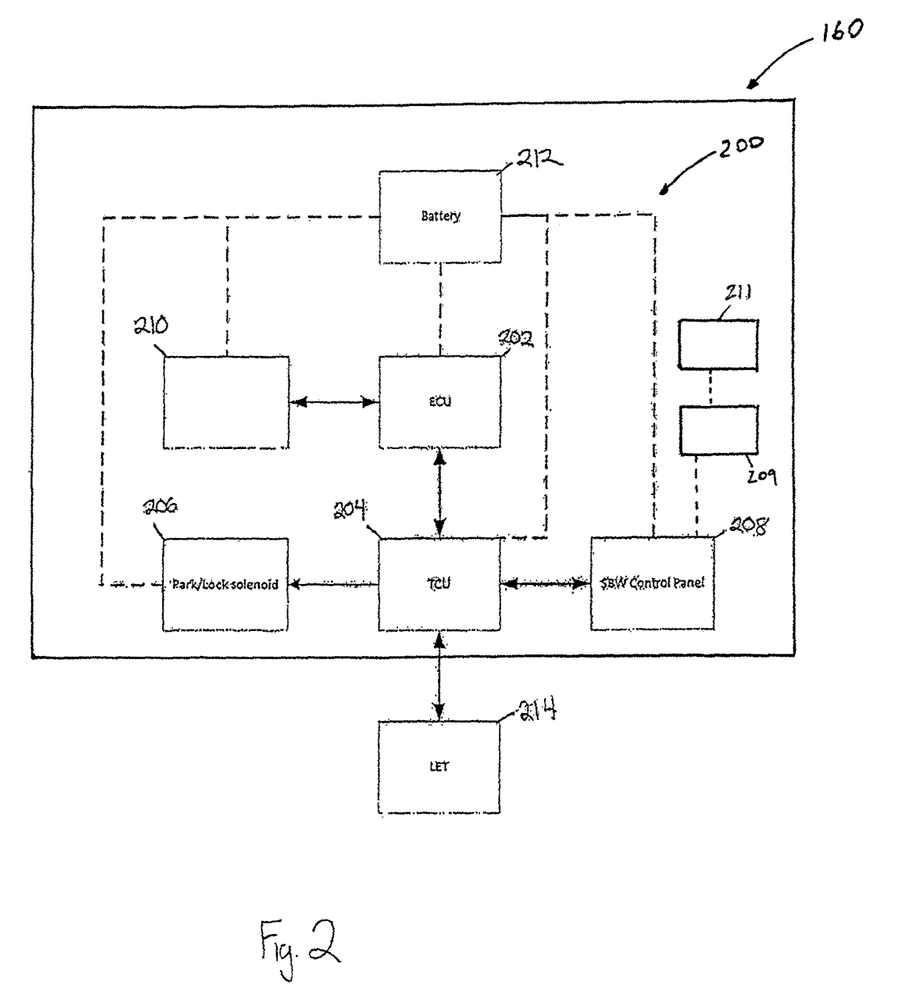
FIG. 2 is a schematic representation of a portion of a vehicle control system.

Referring now to FIG. 2, a schematic representation of a portion of an exemplary vehicle 160 and vehicle control system 200 is depicted. In one embodiment, the vehicle control system 200 includes at least an engine control unit (ECU) 202 and a transmission control unit (TCU) 204. The ECU 202 is in signal communication with the TCU 204. In certain embodiments, when the vehicle includes a shift-by-wire transmission, the TCU 204 may be in signal communication with a park-lock solenoid 206. The park-lock solenoid 206 may be configured so that after receiving a signal from the TCU, park-lock solenoid 206 is in a first position that allows the shift-by-wire transmission to be configured in any possible gear configuration. The park-lock solenoid 206 may be configured in a second position such that the shift-by-wire transmission is forced into a parked gear configuration that prevents the vehicle from moving. The vehicle control system 200 may also include a shift-by-wire (SBW) control panel 208 that is in signal communication with the TCU 204, the vehicle control system may further be connected to an operator gear selector 209 and at least one visual indicator 211. In one embodiment, a plurality of sensors and/or other internal control units 210 are in signal communication with the ECU 202. Electrical power represented by the dashed lines in FIG. 2 is provided by a vehicle electrical system that includes a battery 212. In certain embodiments, the ECU 202 directs electrical power to be supplied to different components. For example, in different modes, only some internal control units and/or sensors may require power from the battery 212. The distribution of electrical power from the battery 212 or, alternatively, from an alternator coupled to the vehicle engine (not shown) may be controlled by the ECU 202 through various hardware and software methods and technologies known to one having ordinary skill in the art.

Still referring to FIG. 2, a handheld external controller 214 is depicted in signal communication with the TCU 204. In the exemplary embodiment, the handheld external controller 214 is a line end tester (LET) used by workers in the production process to communicate with the vehicle control system 200. The LET 214 is configured to transmit and/or receive signals from the vehicle control system 200. The LET 214 may include a connector that can be selectively coupled to an on-board diagnostic port (OBD port) that is standard on many vehicles. As an alternative to this wired connection, the LET 214 may communicate with the vehicle control system 200 wirelessly when the vehicles being manufactured include such capability. It is contemplated that one having ordinary skill in the art would understand the different wireless protocols and technologies available for the LET 214 to communicate wirelessly with a vehicle being manufactured. It is also contemplated that the LET 214 is capable of sending signals to the different controllers of the vehicle control system 200 to retrieve data and or issue commands to change modes and/or active configurations. In some embodiments, the LET may only communicate with the ECU 202 directly and the ECU 202 then communicates with the components of the vehicle control system 200. In certain embodiments, the LET 214 may communicate directly with the sensors and other internal controllers 210, the TCU 204, the SBW control panel 208, or any other component of the vehicle control system 200.

It is contemplated that in certain manufacturing or maintenance situations, vehicles equipped with shift-by-wire transmissions will require the transmission to be in a neutral gear configuration. For example, a single slat conveyor is used in certain factory processes, such as during a final wheel alignment or transporting a nearly complete vehicle to the final preparation line 120 (shown in FIG. 1). In some embodiments, vehicles with shift-by-wire transmissions may include systems or features that are not available on a vehicle having a transmission with mechanical linkage. For example, as a safety measure, a vehicle equipped with a shift-by-wire transmission may automatically shift the transmission into a parked gear configuration when a door of the vehicle is opened. In some embodiments, stopping the vehicle's engine may also cause the shift-by-wire transmission to automatically shift into the parked gear configuration. More specifically, in some vehicles, upon receipt of an ignition off signal and/or a door open signal, the vehicle control system 200 deactivates the park-lock solenoid 206, which places the vehicle in a parked gear configuration that prevents the vehicle from moving. While this may be helpful to the end user as a safety feature, automatically shifting the shift-by-wire transmission into a parked gear configuration may hamper the manufacturing process. To facilitate use of desired manufacturing processes, the LET 214 is configured to place the vehicle equipped with a shift-by-wire transmission into a neutral-hold mode (i.e., plant mode) that temporarily prevents the shift-by-wire transmission from automatically engaging a parked gear configuration.

Figure 3:
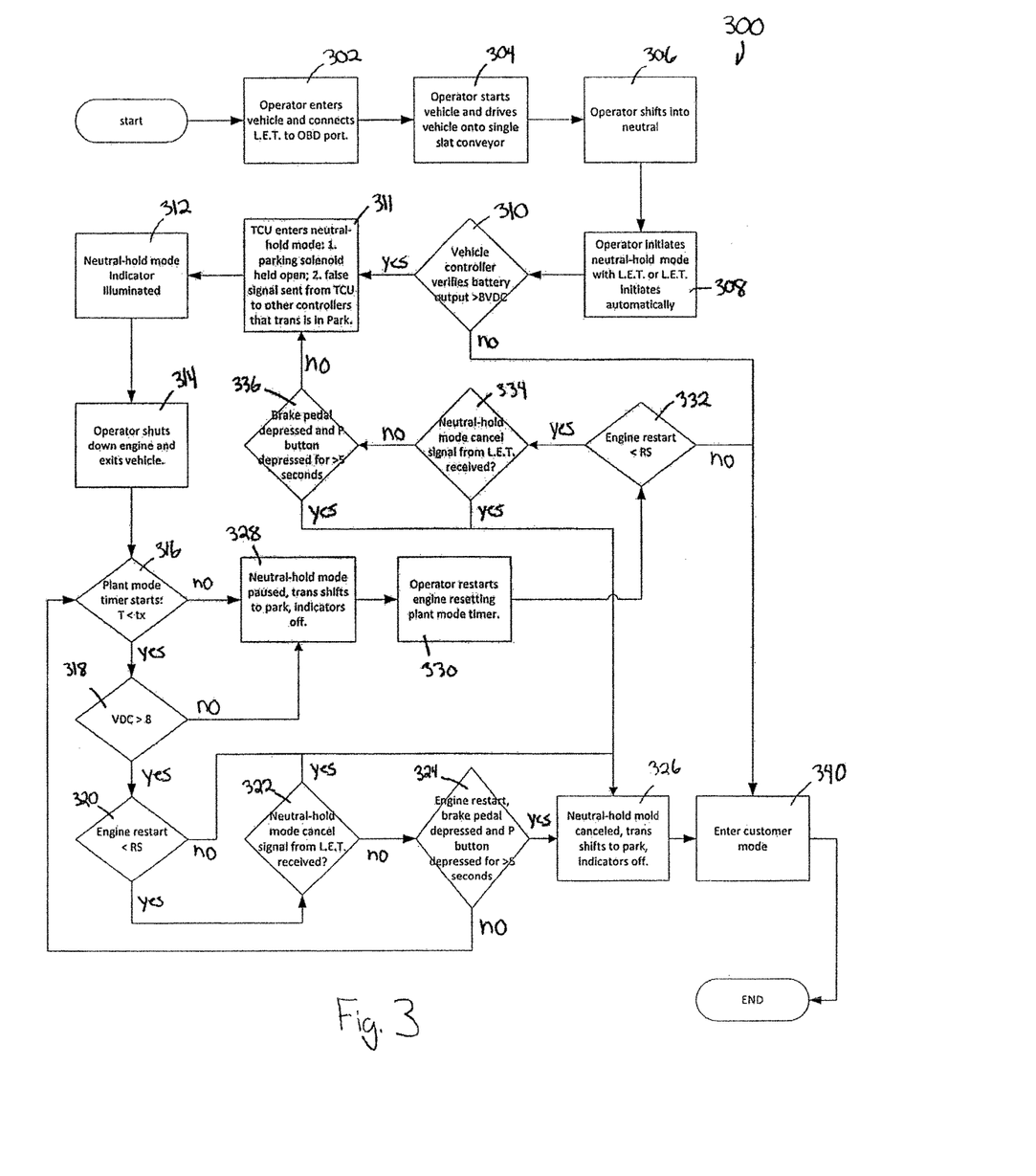
FIG. 3 is a flow chart depicting an exemplary process of positioning the vehicle control system of FIG. 2 in a neutral-hold mode.

Now referring to FIG. 3, a process for configuring a vehicle equipped with a shift-by-wire transmission in a plant or neutral-hold mode 300 is depicted. During the final vehicle assembly portion 112, the neutral-hold mode 300 may be necessary for one or more particular processes. In FIG. 3, the process is described in terms of an operator loading the vehicle onto a single slat conveyor that requires the vehicle to remain in a neutral gear configuration as two wheels need to be free to roll for the vehicle to move along the line. An operator enters the vehicle and connects 302 the LET 214 so that the LET 214 is in signal communication with one or more components of the vehicle control system 200. The operator then starts the vehicle engine and drives 304 onto a single slat conveyor. The operator then shifts 306 the shift-by-wire transmission into a neutral gear configuration. In the exemplary embodiment, the operator initiates 308 the neutral-hold mode 300 using the LET 214. In an alternative embodiment (also depicted in FIG. 3), the LET 214 automatically initiates 308 the neutral-hold mode 300. Next the ECU 202 verifies 310 the battery 212 output is greater than a predefined state-of-charge and/or greater than a current voltage level. For example, ECU 202 may verify 310 the state-of-charge of the battery 212 is above 80% and/or the voltage level is greater than 8.0 volts. In some embodiments, the TCU 204 may verify 310 the battery 212 output. It is also contemplated that a separate meter (not shown) may measure the battery 212 output and be in signal communication with the ECU 202 and or the TCU 204. The TCU 204 then enters 311 the neutral-hold mode 300 including configuring the park-lock solenoid 206 into a neutral gear configuration position and a false signal is sent to the ECU 202 by the TCU 204. The false signal indicates to the ECU 202 that the shift-by-wire transmission is configured in a parked gear configuration. The TCU 204 then signals the SBW control panel 208 to illuminate 312 the neutral hold mode 300 indicator (an example indicator is represented as 211 in FIG. 2). In some embodiments, a visual indicator is illuminated on the SBW control panel 208 so that operators can see that the vehicle is in neutral-hold mode 300. More specifically, a visual indicator on the SBW control panel 208 may flash or be lit in a distinctive color to provide a clear indication that the vehicle is in neutral-hold mode 300. The operator can then turn the vehicle ignition off and exits 314 the vehicle without the transmission automatically entering the parked gear configuration.

Still referring to FIG. 3, in some embodiments, when the vehicle engine is stopped, the ECU 202 configures the battery 212 output to only provide electrical power to the TCU 204, the SBW control panel 208, and the park-lock solenoid 206. In some embodiments, this is to minimize power drawn by the systems connected to the battery 212. With the vehicle engine stopped 314, a plant mode timer 316 is started. The plant mode timer 316 ensures that the neutral-hold mode is not activated for an extended period of time such that the battery 212 is drained and ensures that the state of charge of the battery 212 is above a predefined level when the manufacturing process is complete. Furthermore, the plant mode timer 316 ensures that the vehicle is not in the neutral-hold mode when it is delivered to a dealership or customer. In some embodiments, the period of time the vehicle is allowed to be in the neutral-hold mode is limited to a period of time dependent on the battery 212 output. In some embodiments the time limit may be a maximum of three hours. While the plant mode timer 316 is running, the TCU monitors other conditions. The battery 212 output is monitored 318 to confirm that the voltage output remains greater than 8 volts. Also, upon entering the neutral-hold mode 300, an engine restart counter 320 is initiated. If the engine restart count is less than a specified value RS, the plant mode timer 316 continues and the vehicle remains in the neutral-hold mode 300. The TCU 204 also monitors for two conditions that will cancel the neutral-hold mode 300. The first condition 322 is a neutral-hold mode cancellation signal sent from the LET 214. The second condition 324 is the engine restarting while the brake pedal and a button for selecting the parked gear configuration on the SBW control panel 208 is pressed for 5 seconds. If either the first condition 322 or the second condition 324 is detected by the TCU 204 during the time the plant mode timer 316 is running, the TCU 204 will cancel 326 the neutral-hold mode 300. Cancelling 326 the neutral-hold mode 300 includes at least the TCU 204 configuring the shift-by-wire transmission in a parked gear configuration and deactivating the neutral-hold mode indicator to enter a customer mode 340.

Referring further to FIG. 3, the TCU 204 monitors 318 for the battery 212 output, the engine restart counter 320, the first condition 322, and the second condition 324 in a continuous cycle while the plant mode timer 316 is running. If the TCU 204 detects that the plant mode timer 316 has reached a specific predetermined value tx, or if the battery 212 output equals 8 volts, the TCU 204 pauses 328 the neutral-hold mode 300. The TCU 204 configures the shift-by-wire transmission into a parked gear configuration, deactivates the park-lock solenoid 206, and deactivates the indicator on the SBW control panel 208 when the neutral-hold mode 300 is paused 328. In the paused 328 state, the battery 212 is also instructed to stop providing power to conserve energy. The vehicle will stay in the paused condition 328 until an operator restarts 330 the engine which causes the vehicle control system 200 to be powered again. The TCU 204 verifies 332 the engine restart counter is still less than RS. If the engine restart counter is not less than RS, the vehicle enters into customer mode 340 and the neutral-hold mode 300 is canceled. The TCU 204 also monitors a third condition 334 and a fourth condition 336 which are substantially the same as the first condition 322 and the second condition 324, respectively. If the TCU 204 detects the third condition 334 or the fourth condition 336 after the plant mode timer pauses 328, the vehicle cancels the neutral-hold mode 300 and enters into the customer mode 340. If the TCU 204 does not detect the third condition 334 or the fourth condition 336 after the plant mode timer pauses 328, the TCU 204 enters 311 into the neutral-hold mode 300.

It is also contemplated that the plant mode timer 316 is reset every time the vehicle engine is restarted. Also, in some embodiments, one method for canceling the neutral-hold mold 300 is to restart and stop the vehicle engine the specified amount of times RS while the plant mode timer 316 is running. It is also contemplated that the battery 212 output limit may be any value depending on the requirements of the vehicle.

Figure 4:
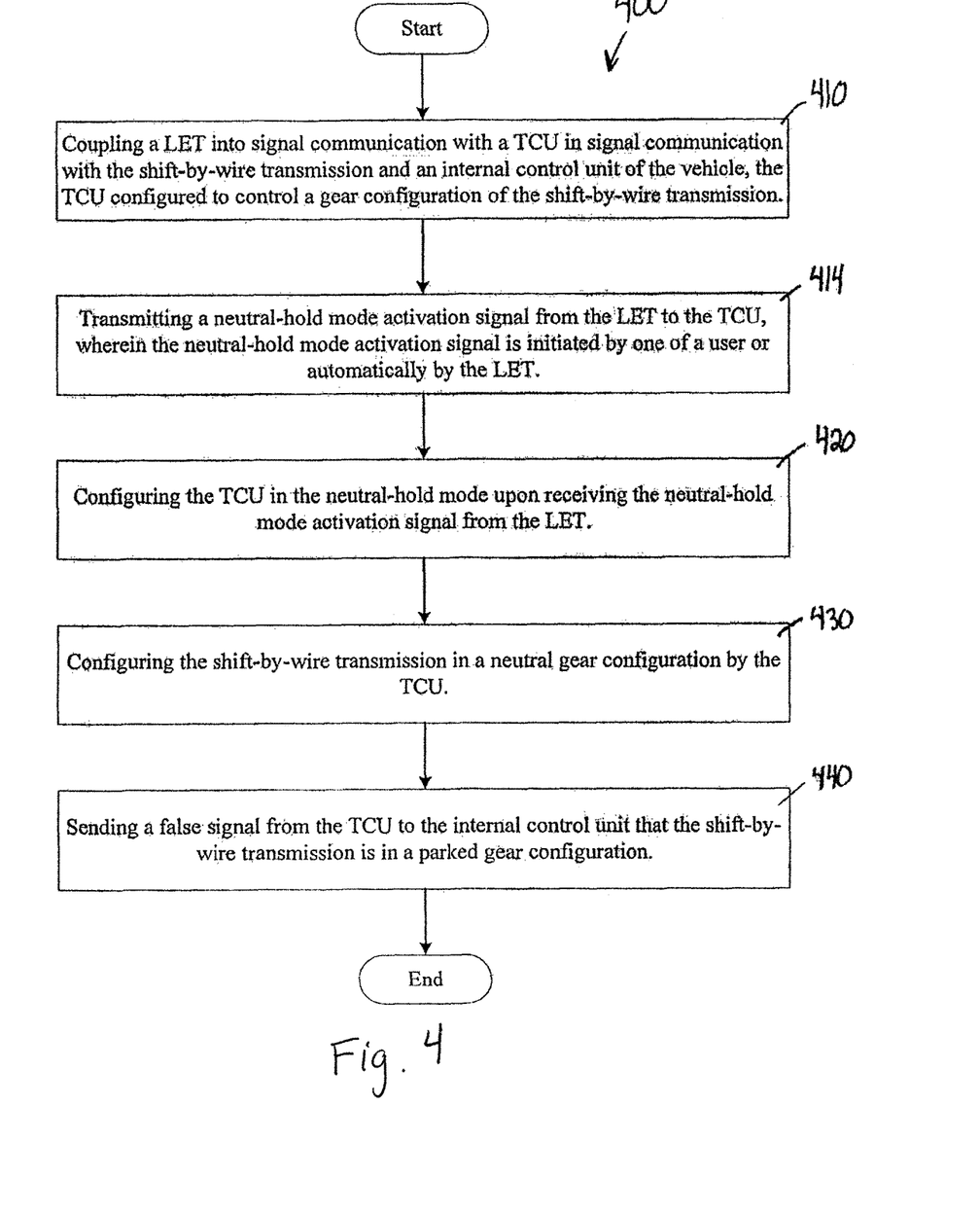
FIG. 4 shows an exemplary method for holding a vehicle in a neutral-hold mode.

Referring now to FIG. 4, an exemplary method of holding a vehicle equipped with a shift-by-wire transmission in a neutral-hold mode 300 is depicted. At block 410, the LET 214 is coupled in signal communication with the TCU 204, which is coupled in signal communication with the shift-by-wire transmission and the internal control unit 202 of the vehicle. The TCU 204 is configured to control a gear configuration of the shift-by-wire transmission. At block 414, the LET transmits a neutral-hold mode 300 activation signal to the TCU 204. The neutral-hold mode 300 activation signal may be initiated by a user or may be automatically sent by the LET 214. At block 420, the TCU 204 is configured in the neutral-hold mode 300 upon receiving the neutral-hold mode 300 activation signal from the LET 214. The method 400 then includes configuring 430 the shift-by-wire transmission in a neutral gear configuration by the TCU 204. A false signal is sent 440 from the TCU 204 to the internal control unit 202 indicating that the shift-by-wire transmission is in a parked gear configuration. It is also contemplated that configuring the TCU 204 in the neutral hold mode 300 includes starting the plant mode timer 316 upon stopping the engine of the vehicle. When the plant mode timer 316 reaches a predefined value, tx, the TCU 204 may configure the shift-by-wire transmission in a parked gear configuration and send a signal to the internal controller 210 indicating that the shift-by-wire transmission is in the parked gear configuration. In certain embodiments, the plant mode timer 316 is reset every time the vehicle engine is restarted while the plant mode timer 316 is activated.

It is contemplated that in some embodiments, the ECU 202, the TCU 204, and the other internal controllers 210 are stand alone units that are in signal communication with the other components of the vehicle control system 200. In some embodiments, the ECU 202, the TCU 204, and the other internal controllers 210 are included within, or coupled to, a controller area network (CAN) bus included within the vehicle control system 200.

The LET 214, the ECU 202, the TCU 204, and the other internal controllers 210 may act or perform control functions disclosed herein, and may include one or more processors, memory and/or one or more programmable hardware elements. As used herein, the term "controller" is intended to include any types of processors, CPUs, microcontrollers, digital signal processors, or other suitable devices capable of executing software instructions. Further, memory may include a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, or DR DRAM, for example; or an installation medium, such as software media, e.g., a CD-ROM, or floppy disks, on which configuration data and programs may be stored and/or data communications may be buffered. The term "memory" may also include other types of known or future developed memory or combinations thereof.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:

1. A system for maintaining a vehicle in a neutral-hold mode, the vehicle including a shift-by-wire transmission, the system comprising:
    a transmission control unit in signal communication with the shift-by-wire transmission and a first control unit of the vehicle, the transmission control unit configured to control a gear configuration of the shift-by-wire transmission; and
    a second control unit removably coupled to a vehicle control system that is in signal communication with at least the transmission control unit, wherein the second control unit sends a neutral-hold mode activation signal to the transmission control unit, causing the transmission control unit to remain powered even if the engine of the vehicle is stopped.

2. The system of claim 1, wherein the second control unit is a line end tester removably coupled to the vehicle control system and configured to automatically transmit the neutral-hold mode activation signal to the transmission control unit once operatively coupled to the vehicle control system.

3. The system of claim 1, wherein, upon receipt of the neutral-hold mode activation signal, the transmission control unit is configured to transmit a false signal to the first control unit indicating the automatic shift-by-wire transmission is in a parked configuration.

4. The system of claim 3, wherein the false signal prevents the first control unit from transmitting a signal to the transmission control unit to configure the shift-by-wire transmission to the parked configuration when at least one of an ignition off signal is received and a door open signal is received.

5. The system of claim 1, wherein the transmission control unit is configured to start a timer when a vehicle engine is stopped and the neutral-hold mode activation signal has been received.

6. The system of claim 5, wherein the transmission control unit configures the shift-by-wire transmission in a parked configuration after the timer reaches a predefined value.

7. The system of claim 1, wherein the transmission control unit requires a specified minimum voltage output from a vehicle battery before configuring the shift-by-wire transmission in the neutral-hold mode.

8. The system of claim 1, wherein a park lock solenoid remains activated in the neutral-hold mode when the internal controller receives at least one of an ignition off signal and a door open signal.

9. The system of claim 1, further comprising a visual indicator displayed on an operator gear selector of the vehicle indicating when the vehicle is in the neutral-hold mode.

10. A method of maintaining a vehicle in a neutral-hold mode, the vehicle having a shift-by-wire transmission, a transmission control unit, a park-lock solenoid, and a first control unit, the method comprising:
    receiving, at the transmission control unit, a neutral-hold mode activation signal from a second control unit, wherein the neutral-hold mode activation signal is initiated manually or automatically by the second control unit when the second control unit is communicatively coupled to the vehicle, wherein the neutral-hold mode causes the transmission control unit to:
        activate the park-lock solenoid to allow the shift-by-wire transmission to be in a neutral gear configuration; and
        transmit a false signal from the transmission control unit to the first control unit indicating the shift-by-wire transmission is in a parked gear configuration; and
    canceling the neutral-hold mode upon a substantially simultaneous receipt of a brake pedal actuation signal and a parking gear selector signal.

11. The method of claim 10, further comprising:
    starting a neutral-hold mode timer upon stopping an engine of the vehicle;
    de-activating the park-lock solenoid when the neutral-hold mode timer exceeds a predefined time limit; and
    resetting the neutral-hold mode timer when the vehicle engine is restarted.

12. The method of claim 11, further comprising:
    configuring the shift-by-wire transmission in the neutral gear configuration;
    sending the false signal from the transmission control unit to the first control unit indicating the shift-by-wire transmission is in the parked gear configuration after restarting the engine after the neutral-hold mode timer reached the predetermined value; and resetting the neutral-hold mode timer.

13. The method of claim 10, further comprising:

receiving, at the transmission control unit, a neutral-hold mode deactivation signal from the second control unit;

de-activating the park-lock solenoid to shift the shift-by-wire transmission to the parked configuration; and transmitting from the transmission control unit a signal to the first controller indicating the shift-by-wire transmission is in the parked configuration.

14. The method of claim 10, further comprising:

monitoring the voltage output of a battery of the vehicle; and shifting by the transmission control unit the shift-by-wire transmission to the parked configuration when a voltage output of the battery falls below a predetermined value.

15. The method of claim 10, wherein canceling the neutral-hold mode comprises:

de-activating the park-lock solenoid to shift the shift-by-wire transmission to the parked configuration; and transmitting a signal to the first control unit indicating the shift-by-wire transmission is in the parked configuration.

16. The method of claim 10, further comprising:

displaying a visual indicator on an operator gear selector of the vehicle when the transmission control unit is in the neutral-hold mode.

17. A system for maintaining a vehicle in a neutral-hold mode, the vehicle including a shift-by-wire transmission, the system comprising:

a transmission control unit in signal communication with the shift-by-wire transmission and a first control unit of the vehicle, the transmission control unit configured to control a gear configuration of the shift-by-wire transmission; and a second control unit in signal communication with the transmission control unit, the second control unit configured to transmit an activation signal to the transmission control unit to configure the shift-by-wire transmission in a neutral configuration, and when an engine of the vehicle is stopped, the transmission control unit configured to transmit a signal to the first control unit to configure the vehicle to only provide electrical power to the transmission control unit and a park-lock solenoid to maintain the neutral-hold mode.

18. The system of claim 17, wherein the voltage output from a battery of the vehicle is monitored, the transmission control unit configured to configure the shift-by-wire transmission in a parked configuration and transmit a signal to the first control unit to discontinue providing electrical power to the transmission control unit and the park-lock solenoid when a voltage output from the battery drops below a predetermined value.

19. The system of claim 17, further comprising a timer activated when the engine is stopped, wherein the transmission control unit is configured to move the shift-by-wire transmission into a parked configuration after a predetermined period of time is recorded by the timer without the vehicle engine being restarted and transmit a signal to the internal controller to discontinue providing electrical power to the transmission control unit and the park-lock solenoid.

* * * * *